Sept. 12, 1950     W. H. DU SHANE     2,522,215
DRAFT OR HITCH CONNECTION
Filed June 14, 1948
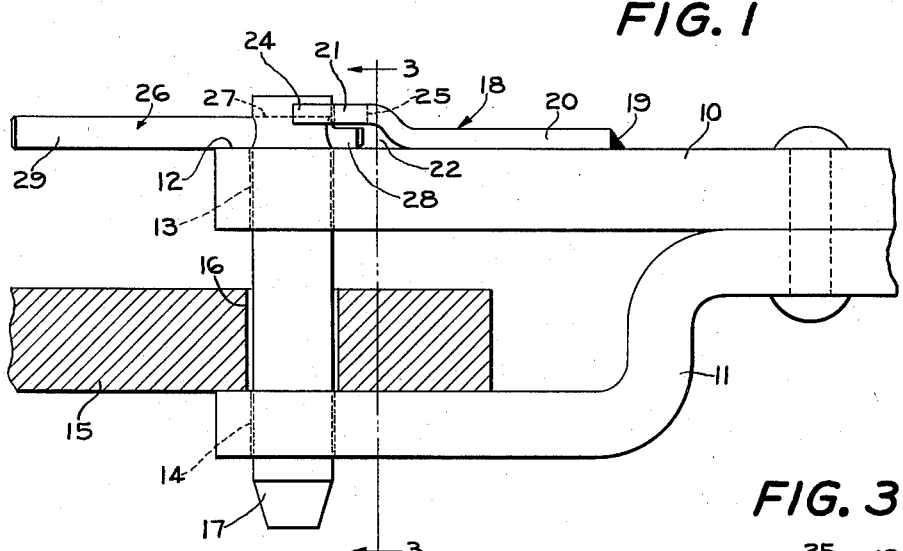
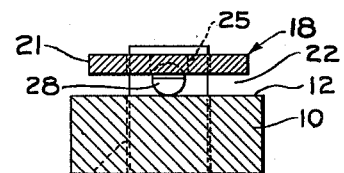
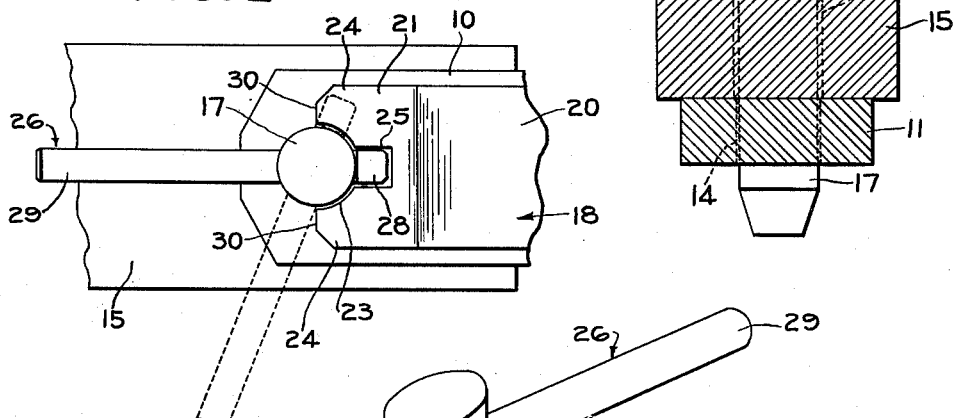
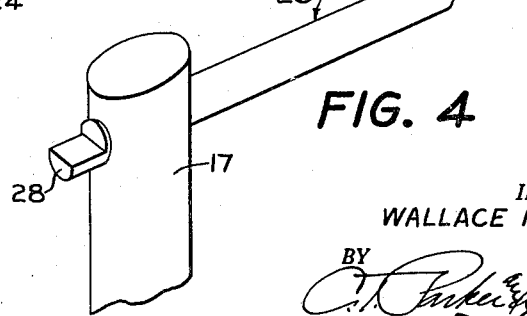
INVENTOR.
WALLACE H. DU SHANE
BY
ATTORNEYS Patented Sept. 12, 1950

2,522,215

UNITED STATES PATENT OFFICE 2,522,215

DRAFT OR HITCH CONNECTION

Wallace H. Du Shane, Waterloo, Iowa, assignor to Deere Manufacturing Co., Dubuque, Iowa, a corporation of Iowa Application June 14, 1948, Serial No. 32,960

4 Claims. (Cl. 296—33.15)

This invention relates to a draft or hitch connection for interconnecting vehicles or tractors and implements.

The most common form of interconnection between vehicles or tractors and implements is a pin which is vertically insertable or removable from above. However, because of the tendency of such pin to become vertically displaced during operation of the vehicles or implements, it is necessary to provide some means for retaining the pin in place. Several types of such means are known, ranging all the way from a simple cotter pin or nut to relatively complicated spring and cam mechanisms. It will be readily recognized that ordinary vibrations set up during the operation of vehicle or implement units interconnected by means including a common threaded pin and nut will cause the nut to work its way off the pin and the pin will eventually work its way out of the connection. It has further been determined that the tendency of the pin to work upwardly developed such force in certain circumstances as to shear off an ordinary pin or cotter key passed through the main pin for the purpose of locking the main pin. Consequently, resort has heretofore been had to locking means including spring-loaded or cam-actuated pins. Although such connections are satisfactory from the standpoint of maintaining the interconnection, they are expensive to manufacture and likely to break down in operation. Further, such connections necessarily involve several movable parts and are likely to become inoperative because of rust, corrosion, or accumulation of material incident to the particular operation in which the vehicle or implement unit is engaged.

The present invention contemplates, and has for a principal object the provision of an improved and simplified draft connection in which a hitch pin of unitary construction is the only movable part. It is an important object of the invention to relate the hitch pin to a retaining means in such manner that accidental escape of the pin from the connection is extremely unlikely under normal conditions. A still further object of the invention is to provide a draft connection in which the pin is insertable through a hitch member which has a retaining member formed with a slot through which may be passed a tongue fixed to the pin, whereby the pin may be rotated so that the tongue engages under the retaining member, the slot and tongue being so dimensioned that vertical withdrawal of the pin from the hitch member and retaining member depends upon substantially perfect vertical alignment of the tongue and slot; in this respect, it is another object of the invention to provide interengageable stops or abutments limiting angular movement of the pin within a range in which the tongue on the pin stays below the retaining member to be confined by the retaining member except when the tongue and slot are vertically aligned. It is known in hitch connections that the hitch pin has a tendency to rotate until it is stopped, after which it will move axially upwardly. According to the present invention, the pin is allowed to rotate or move angularly within limits, but the retaining member is so constructed as to prevent subsequent axial movement of the pin upwardly. A further object of the invention is to construct the hitch connection in such manner that the tongue on the pin is freely movable in a clearance space so that retention of the pin does not depend upon any binding or camming action, thereby eliminating the possibility that the pin could become jammed because of rust, corrosion or collection of material incident to the operation of the vehicle or implement unit in which the connection is used.

The foregoing and other desirable objects and important features inherent in and encompassed by the invention will become apparent to those versed in the art as the disclosure of a preferred embodiment of the invention is more completely made in the following detailed description and accompanying sheet of drawings, in which Figure 1 is a fragmentary view in side elevation of an intermediate portion of a hitch or draft construction;

Figure 2 is a plan view of the structure shown in Figure 1;

Figure 3 is a vertical sectional view taken substantially on the line 3—3 of Figure 1; and Figure 4 is a fragmentary perspective view showing the top portion of the hitch pin.

Although the hitch or draft connection herein set forth may be used in the interconnection of different types of vehicle units, it is primarily designed for the interconnection of a tractor and trailing implement. To this end, the reference numeral 10 in the drawing designates a hitch member which may be the rear part of an ordinary tractor drawbar. The hitch member includes a secondary member 11 which, with the member 10 forms a clevis of conventional construction. The hitch member 10 is provided with an upper surface 12 which is substantially horizontal or flat and which borders a generally vertical, substantially circular aperture 13 provided in the member. The aperture 13 is vertically coaxial with an aperture 14 in the lower or secondary member 11. The numeral 15 represents a second hitch member which may be the forward portion of a tongue, for example, on an implement. The member 15 is vertically apertured at 16 and is normally positioned between the members 10 and 11 with the aperture 16 in vertical alignment with the apertures 13 and 14 so that the apertures may receive a vertical hitch pin 17, the pin being insertable into the apertures and removable from the apertures from above.

The hitch member 10 carries thereon means providing a retaining member indicated generally by the numeral 18. Securing of the member 18 to the member 10 is preferably accomplished by welding, as indicated at 19.

The member 18 is formed generally as a plate having a first portion 20 which is secured to the upper surface of the member 10 and a second portion 21 which is vertically offset above the upper surface 12 of the member 10. There is thus provided between the upper surface 12 and the under surface of the portion 21 a clearance space 22 adjacent the aperture 13, and also adjacent the upper portion of the pin 17 when the pin is in place. The portion 21 is bifurcated in such manner as to provide a generally semi-circular notch 23 that is coaxial with the aperture 13. The bifurcation of the portion 21 provides a pair of furcations 24, each of which provides an extension or lip on the portion 21 and defining portions of the clearance space 22. The bifurcation or notch 23 is so shaped as to include a communicating gap or slot 25 which is here shown as extending outwardly generally normal or radial to the common axis of the pin 17 and apertures 13 and 16. This notch is cut completely vertically through the portion 21 of the retaining member 18 so as to provide a vertical passage in communication with the clearance space 22.

That portion of the pin 17 that is normally disposed above the level of the top surface 12 of the member 10 is provided with means for retaining the pin against accidental vertical displacement and for preventing the pin from dropping completely through the aligned apertures in the members 10, 11 and 15. This means is preferably in the form of a rod-like member or element, designated generally by the numeral 26, passed diametrically through a bore 27 provided in an upper portion of the pin 17. The rod 26 extends at opposite sides of the pin 17, and at one side has a shorter portion which provides a tongue 28 and at its other side has a longer portion which provides a handle 29. The rod is preferably circular in cross section and the portion providing the tongue 28 is reduced in its vertical dimension so that the tongue may be readily and freely accommodated in the clearance space 22 beneath the furcations or lips 24 on the portion 21 of the retaining member 18. The reduction in the vertical dimension of the tongue 28 is preferably accomplished by milling off a top portion thereof. The lateral dimension of the tongue 28 is only slightly less than the width of the slot 25, so that the tongue may pass vertically through the slot with but limited clearance. Thus the pin 17 may be dropped into place from above with the tongue 28 in vertical alignment with the slot 25 so that the former may enter the clearance space 22, after which the handle 29 may be utilized to move the pin 17 angularly to misalign the tongue 28 and slot 25, whereupon the tongue 28 will lie below one or the other of the lips or furcations 24.

Each lip or furcation has a terminal edge 30 which, in the preferred construction illustrated, lies on a diameter of the semi-circular notch or bifurcation 23. The terminal edge portions 30 thus provide abutments spaced apart an angular distance of 180 degrees. Since the handle 29 is diametrically opposite the tongue 28, it will extend substantially in the same direction as the lips 24 and, as the pin moves angularly about its axis, the handle will approach one or the other of the terminal edge abutments 30.

As previously stated, the member 26 that provides the tongue 28 and handle 29 is of circular cross section, with a portion thereof being milled off to provide a reduced vertical dimension on the tongue 28. The handle portion 29 is unchanged in vertical dimension and is thus larger than the tongue 28. It will be noted also that the vertical dimension of the handle 29 is greater than the vertical distance between the top surface 12 of the member 10 and the under surface of the lips or furcations 24 on the portion 21 of the retaining member 18. Consequently, the increased vertical dimension of the handle 29 provides a stop portion which is engageable with one or the other of the abutment edges 30 on the furcations, inasmuch as the handle 29 cannot pass below either furcation. The dotted line position of the handle 29 in Figure 2 shows that engagement of the handle 29 with one of the furcations 30 confines angular movement of the pin 17 to a range in which the tongue 28 remains under the opposite furcation. Similarly, when the handle 29 engages the opposite terminal edge abutment 30, the tongue 28 will lie under the first mentioned furcation. In brief, the tongue 28 is confined beneath the furcations or lips and cannot escape vertically except when the tongue and the slot 25 are vertically aligned. Inasmuch as the dimensions of the tongue 28 and slot 25 are such that only limited clearance is provided it will be seen that the two must be substantially perfectly aligned vertically before the pin can be moved upwardly. Ordinarily, it will require manual control to accomplish this substantially perfect alignment of the tongue and slot and normally the chances of accidental alignment of the two are negligible.

Summarizing briefly the important features of the invention, it will be noted that the tongue 28 is freely swingable in an arcuate path through the clearance space 22 and retention of the pin does not depend upon any binding or jammed relationship of the parts. The clearance is therefore such as to eliminate the possibility of accidental jamming of the parts by rust, corrosion or accumulation of foreign material. The element 26 is preferably connected to the pin 17 by means of a press fit accomplished by the proper dimensioning of the part 26 and bore 27 of the pin. The pin and element 26 thus become, in effect, a one-piece structure. Likewise, the retaining member 18 is rigidly secured to the member 10. In general, the construction is such that the only movable part in the connection in so far as the retaining action is concerned is the pin structure 17—26.

It should be understood that the present disclosure relates to a preferred form of the invention and that the detailed description and

What is claimed is:

1. In a draft or hitch structure: a hitch member having a vertical aperture therein and provided with a generally flat top surface bordering said aperture; a retaining member secured to the hitch member and overlying the hitch member surface and including a generally flat under surface spaced in parallelism above the hitch member surface to provide a clearance space adjacent the aperture, said retaining member having a bifurcation generally in vertical alignment with the aperture so that unobstructed access may be had to the aperture from above and between the furcations thus provided, said retaining member further having a slot offset from the aperture in a direction generally normal to the vertical axis of the aperture and opening to the bifurcation and further extending generally vertically through the retaining member to provide a passage to and from the clearance space; a hitch pin of substantially circular cross-section insertable between the furcations and receivable in the aperture for angular movement therein, and having a tongue projecting therefrom in a direction conforming to the disposition of the slot, said tongue being so dimensioned with respect to the slot as to closely fit and pass generally vertically through the slot and further so dimensioned as to be loosely receivable in and movable in an arcuate path through the clearance space and below the furcations to become angularly mis-aligned with the slot; and a handle on the pin projecting therefrom in a direction generally diametrically opposite the tongue and disposed to freely overlie a portion of the top surface of the hitch member between the furcations, said handle and furcations being so constructed and arranged as to provide cooperative stops angularly related so that the pin may move freely angularly in the aperture within a range in which the tongue is confined beneath one or the other of the furcations and may be withdrawn vertically from the aperture only when the tongue and slot are vertically aligned.

2. In a draft or hitch structure: a hitch member having a vertical aperture therein and provided with a generally flat top surface bordering said aperture; a retaining member secured to the hitch member and overlying the hitch member surface and including a generally flat under surface spaced in parallelism above the hitch member surface to provide a clearance space adjacent the aperture, said retaining member having a semi-circular notch providing a bifurcation generally coaxial with the aperture so that unobstructed access may be had to the aperture from above and between the furcations thus provided, said retaining member further having a slot offset from the aperture in a direction generally normal to the vertical axis of the aperture and opening to the bifurcation and further extending generally vertically through the retaining member to provide a passage to and from the clearance space; a hitch pin of substantially circular cross-section insertable between the furcations and receivable in the aperture for free angular movement therein; and a lock element carried by the pin at a portion thereof above the hitch member, including a part disposed substantially on a diameter of the pin and providing a tongue at one side of the pin and a stop member at the other side of the pin, said tongue being so dimensioned with respect to the slot as to closely fit and pass generally vertically through the slot and further so dimensioned as to be loosely receivable in and freely movable in an arcuate path through the clearance space and below the furcations to become angularly mis-aligned with the slot, and said stop being normally disposed to project in the same direction as and between the furcations to be swingable arcuately freely across the top surface of the hitch member and between the furcations as the pin moves angularly, said stop being engageable with one or the other of the furcations to limit angular movement of the pin to less than a complete revolution.

3. The invention defined in claim 2, further characterized in that: the lock element comprises a rod passed through the pin and the tongue portion thereof is reduced in vertical dimension so as to be freely accommodated in the clearance space, and the stop portion thereof is of a vertical dimension greater than the spacing of the furcations above the hitch member so as to abut one or the other of the furcations when the pin moves angularly.

4. In a draft connection or the like: a hitch member having a generally vertical aperture therein; a hitch pin passed downwardly into the aperture and freely angularly movable therein; means at the upper end of the pin providing a tongue projecting outwardly from the pin in a direction generally normal to the axis of the pin to overlie a top portion of the hitch member, said tongue being connected to the pin and freely swingable in an arcuate path over the hitch member as the pin moves angularly; and means on the hitch member including a pair of lip members separated by a slot that is generally normal to the axis of the pin and so disposed and of such dimensions as to provide for vertical passage of the tongue therethrough with but limited clearance, said lips being spaced above the hitch member a distance slightly exceeding the vertical dimension of the tongue so as to clear the tongue as it moves in its arcuate path, said lips further overlying substantial top portions of the hitch member and hence overlying substantial parts of the possible path of arcuate movement of the tongue and being imperforate to the extent that vertical escape of the pin from the hitch member can occur only when the tongue and slot are vertically aligned.

WALLACE H. DU SHANE.

REFERENCES CITED

The following references are of record in the file of this patent:

UNITED STATES PATENTS

| Number | Name | Date |
|--------|------|------|
| 1,030,527 | Nelson | June 25, 1912 |
| 1,487,616 | Stockton | Mar. 18, 1924 |